3,216,932
SALT PRODUCT AND METHOD OF MAKING
AND USING SAME
John F. Heiss, St. Clair, and Richard Kolasinski, Richmond, Mich., assignors to Diamond Crystal Salt Company, St. Clair, Mich., a corporation of Michigan
No Drawing. Filed Nov. 8, 1962, Ser. No. 236,445
9 Claims. (Cl. 210—32)

The present invention relates to an improved salt product which is particularly useful in rejuvenating and regenerating fouled ion exchange resins and to the method of making and using that improved product.

In the art of softening and purifying water, it is well known that many water supplies contain soluble and insoluble iron in addition to the compounds of calcium, magnesium, and the like, which cause hardness. It is also well known that iron bearing waters favor the growth of iron bacteria, known as iron crenothrix. These growths form abundantly in water mains, recirculating systems and in water-softener ion-exchange beds and ultimately exert a clogging action and cause reduction in flow rates of the water in such systems. Oftentimes, the bacterial growths break loose in large masses, or may decay and cause bad taste and odors in the water. Many commercial installations are equipped with means for converting soluble iron to insoluble iron and then removing the iron precipitate from the water by filtration. Such filtration equipment is expensive and is not to be found in many small commercial and in domestic or household installations for water purification and softening. In these instances the water is softened and the iron is removed by the use of ion exchange resin beds. While ion exchange resins are satisfactory for removing low concentrations of iron from raw water, difficulty is oftentimes encountered after a period of time because iron ordinarly accumulates in the ion exchange resin upon continued use even though conventional regeneration procedures are employed. In these cases, it is known that the regeneration of the resin is partially unsuccessful because of the irreversible oxidation of iron within the resin bed which occurs with the passage of time.

The known procedures for eliminating iron from water include the addition of hydrochloric acid to the water and this procedure is adaptable for commercial use but the difficulty of handling the material and its corrosive attack on household equipment makes it unsuitable for use in domestic installations. Iron may also be removed by the use of sodium hydrosulfite which reduces the iron and allows it to be removed from the water, but this method is accompanied by the disadvantage that sodium hydrosulfite creates gases which have an obnoxious odor and is an unstable material which is susceptible to spontaneous ignition in the presence of large amounts of moisture which may become adsorbed on it. Iron may also be removed by the use of chelating agents of either the inorganic type such as phosphate derivatives or the organic type such as ethylene diamine tetra acetic acids. The use of chelating agents is expensive and slower than the use of the hydrosulfites and for this reason has not attained widespread acceptance. Thus, the known procedures and materials which are in use for restoring spent and fouled ion exchange resins to clean, regenerated form still leave much to be desired.

It is, therefore, the primary object of this invention to provide a material capable of simultaneously rejuvenating fouled ion exchange resins and regenerating those resins.

Another object of this invention is to provide an improved solid product which contains an agent capable of rejuvenating fouled ion exchange resins.

Another object of this invention is to provide an improved salt product from which brine may be made which is suitable for the improved purification and regeneration of fouled ion exchange resins.

Another important object of this invention is to provide an improved salt product in the form of compressed salt briquettes which contain distributed therethrough a releasable agent capable of rejuvenating and purifying fouled ion-exchange resins.

A further object of this invention is to provide a method for softening and purifying water which supplies to a rejuvenating and regenerating brine the necessary predetermined quantity of material for iron removal as it is needed in a continuous process.

Still another object of this invention is to provide a salt briquette having improved resistance to softening upon standing in brine solution and improved resistance to caking in moist atmospheres.

Yet another object of this invention is to provide an improved salt material containing on its particle surfaces or uniformly distributed within an aggregate of such particles, an agent capable of rejuvenating ion-exchange resins fouled with iron, and which material is storage stable, under ordinary storage conditions, for extended periods of time.

A still further object of the present invention is to provide a method for making the improved salt product of this invention which is simple, inexpensive and readily controlled to provide a product of uniform characteristics.

Another object of this invention is to provide a water soluble carrier having on its surface, or distributed interiorly thereof or both, an agent capable of rejuvenating ion-exchange resins fouled with iron and releasing that agent uniformly as it is needed for any intended purpose.

Other objects and advantages of this invention will become apparent upon consideration of the description of the invention, which follows.

In accordance with this invention, it has been found that the above and related objects may be attained by admixing with salt, or other compatible water soluble particulate material an agent consisting essentially of (A) a mineral acid or an acid salt providing a mineral acid radical in aqueous solution, (B) a di-alkali metal sulfonate of an alkylated diphenyl ether and (C) a di-alkali metal sulfonate of di-naphthyl methane. In relation to one another, about 1.5 to 3 mols of (C) are used with about 3 to about 7 mols of (B). These two components in the stated relative quantities can be used with component (A) in any desired quantity, but generally are used with about 100 to about 300 mols of (A). The components (A), (B), and (C) are combined with water and may be used in a concentration of active ingredients in the range of about 1% to about 30% by weight. As the concentration of active ingredients in the water decreases, the relative effectiveness of the agent in performing its function of rejuvenating ion-exchange resins fouled with iron decreases in speed, and in the ordinary case it is desirable to use the agent in a form which contains a concentration of active ingredients which will enable both rejuvenation and regeneration in the time ordinarily employed only in regeneration, such as, for example, a concentration in the range of about 20% to about 30% by weight. When the agent contains about 30% by weight of active ingredients, it becomes somewhat viscous and it is relatively difficult to uniformly apply to the particulate carrier of this invention, such as salt. It is possible, however, to use materials having an active component weight percentage as high as about 40%.

Component (B), above referred to, which is suitable for use in this invention, includes the di-alkali metal sulfonates or alkylated diphenyl ethers having the formula:

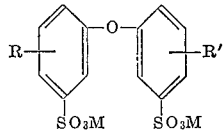

wherein M is an alkali metal and preferably sodium or potassium, R and R' are hydrogen and alkyl radicals containing from 1 to 20 carbon atoms per molecule but wherein R is not hydrogen when R' is hydrogen. Preferably both benzene rings are alkylated and the alkyl chains contain 8 to 16 carbon atoms per molecule. This component of the agent of this invention is commercially available and its method of manufacture is well known and has been published in, for example, U.S. Patent No. 2,854,477 to Steinhauer. The product of the process of U.S. Patent 2,854,477 is a mixture of the di-alkali metal sulfonates of alkylated diphenyl ether in which the average number of alkyl radicals per molecule is from 1 to 2 and, for the purposes of this invention, component (B) may comprise satisfactorily a mixture of this type. A typical product which is outstandingly satisfactory for the purposes of this invention is about an equal molar mixture of disodium-4-dodecyl-2, 4' oxy-dibenzene sulfonate and disodium-2, 2' oxy-bis, 4-dodecyl benzene sulfonate.

The component above generally designated (C) is the di-alkali metal sulfonate of di-naphthyl methane, for example, of the formula:

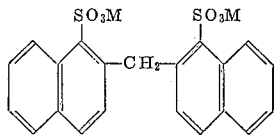

wherein, M is an alkali metal, preferably sodium or potassium. Such compounds are well known and ordinarily are made by treating naphthalene with sulfuric acid or other sulfonating agents at an elevated temperature of approximately 80° C. to sulfonate it. Thereafter, two of the resulting sulfonic acid derivatives of naphthalene are joined by reaction with formaldehyde. The resulting compound is then neutralized with an alkali metal hydroxide, for example, NaOH, to produce a product having the above given formula. It will be appreciated that the naphthalene which may be used in the production of these compounds may be a petroleum hydrocarbon faction and may include a small amount of phenanthrene, or the like. The reaction product thus produced may contain analogous phenanthryl constituents as well as low molecular weight polymers which may be formed and present in small amounts. Such overall mixtures are considered for the purposes of this invention as though they were entirely naphthyl derivatives.

The third major component of the agent of the present invention is a mineral acid and any of the mineral acids can be employed for this purpose. The mineral acid may be introduced in the form of a salt so long as a sufficient quantity of the salt is added to produce a sufficient concentration of mineral acid radical to enable the product to retain its purifying ability when applied to ion-exchange resins fouled with iron. Of the mineral acids the more common acids such as hydrochloric, sulfuric and orthophosphoric acids are preferred. By way of example, it may be stated that a typical composition may contain about 10% to about 30% of commercial concentrated orthophosphoric acid, and for each 1,000 gms. of an aqueous composition containing 20% by weight of active ingredients, there would be present about 2 mols of the acid, about 0.05 mol of (B) and 0.02 mol of (C). When the mineral acid radical is provided in the form of a salt it is preferred that the alkali metal salt be employed, as for example, sodium di-hydrogen phosphate, potassium monohydrogen phosphate, sodium hydrogen sulfate, etc.

The solid particulate portion or carrier for the above defined agent may be any water soluble solid in the form of discrete particles, aggregates or compressed composites of such particles. The carrier functions by retaining the agent of this invention on its surface or absorbed within it, and is a material which maintains its form and at least substantially its chemical constituency when mixed with the agent of this invention, or otherwise simply stated, the carrier is compatible with the agent. The preferred particulate carrier is salt in any of its many available forms, but other compatible water soluble particles, for example, the alkali metal salts of strong mineral acids such as phosphoric, nitric, sulfuric, and muriatic acids are also satisfactory. The preferred form of the product of this invention is an aggregate of a plurality of solid particles, which aggregate may be in the form of nuggets, pellets, briquettes, blocks, extruded shapes such as cylinders, spheres or spheroids, or of regular geometrical shape, such as cubes, squares, rectangular blocks or the like.

In the cleansing or rejuvenating of fouled ion exchange resins, it has been found that aggregates formed from particles having adsorbed on their surfaces or absorbed within the particles an amount of the above defined agent with the specified range release the agent uniformly as the aggregate dissolves in water, thus supplying a slow and regulated release of agent as it is needed. In the case of salt, the addition of agent, in the proportions specified, has been found to increase the resistance to caking of granulated salt in atmospheres of varying humidity. Moreover, the presence of agent in a compressed salt product gives to the product improved resistance to crumbling, breaking, scaling or decrepitating as the compressed product remains immersed in brine for long periods of time. For example, elliptical shaped briquettes of approximately ½″ diameter and about 0.4″ height, containing about 0.2% by weight of agent, pressed at about 25,000 p.s.i. pressure showed less tendency to soften and form fines over a two week period of immersion in saturated brine, with stirring, than similar briquettes except for the presence of the agent. The added agent appears to unite the particle, fill the voids, increase the density and improve the overall resistance to capillary action of brine into the briquettes. In compressed form, the briquettes are preferably larger than 14 screen mesh, but may be satisfactorily formed into blocks of 4, 8 or even up to about 50 pounds. For use in forming brines, in salt in head-types of water softening units, aggregates approximating spheres of ⅛″, ¼″ to about ½″ in diameter represent preferred forms.

The products of this invention in the form of non-aggregated particles having at least a portion of the surface area thereof coated with the agent of this invention, or absorbed within the particles is to be understood to have usefulness for a wide variety of purposes. Rock salt in its as-mined condition, and of a variety of sizes, preferably smaller than No. 2 rock, assimilates and combines with concentrations of agent up to about 0.3% by weight. Such a product functions satisfactorily to form brines containing desired agent concentration for use in the simultaneous rejuvenation and regeneration of fouled ion exchange resins, for addition to solutions fed through pipes or fluid circulation systems clogged with iron crenothrix or the like.

The products of this invention may be made by either of two satisfactory procedures. The first of these comprises the steps of adding the preselected quantity of the above described agent to the selected particulate carrier material, mixing the agent and the carrier sufficiently to insure the uniform distribution of the agent on the surface of the particles of the carrier and, if desired, thereafter converting the coated particles into larger aggregates such as nuggets, pellets, briquettes, or blocks. The agent in the form of an aqueous liquid of the preselected dilution is easily applied by spraying, dripping or otherwise adding the agent to the solid particulated matter, for example, evaporated salt, or granular rock salt, purified salt crystals or granules, compressed briquettes, flake salt such as Alberger flake salt or the like, and after mixing to insure uniform distribution of the added agent, the product is in one of its final forms. In the case of granular rock salt, evaporated salt or flake salt of the Alberger flake type, after the additive is uniformly distributed on the surface the particles may be compressed into the desired form or shape such as spheres, spheroids, cubes or other polyhedrons or they may be rolled into pellets in a pelletizing cylinder, extruded into the shape of cylinders or compacted by cylindrical rolls to form flake salt or briquettes. These steps are equally applicable to the formation of products employing particulated carrier materials other than common salt, such as the alkali metal salts of the strong mineral acids, e.g., phosphoric, nitric, sulfuric, or hydrochloric acids.

In making compressed products such as briquettes it was surprising that the agent could be either mixed with the salt particles prior to pressing to form the briquette or the briquette could be formed from the salt particles prior to the application of the agent of this invention to the briquettes. Using granulated or flake salt, such as Alberger flake type salt, suitable pressures for forming briquettes may satisfactorily vary within the range of about 15,000 p.s.i. to about 35,000 p.s.i., with satisfactory results having been obtained in commercial operation by using pressures of about 25,000 p.s.i. It was surprising that briquettes formed by the use of such pressures would assimilate or absorb sufficiently large quantities of the agent of this invention to render the subsequent release of the agent uniform as the briquette is dissolved during its use in the rejuvenation and regeneration of fouled ion exchange resins. Such briquettes were found to possess a sufficient quantity of voids and to have the property of absorbing the agent of this invention by capillary action easily at a concentration of about 1 lb. of agent per 100 lbs. of salt. The uniformity of release of the agent from briquettes formed prior to the spray application of agent thereto is illustrated in greater detail in one of the specific examples which follows.

The agent of this invention may contain, in addition to the above recited essential components, additives such as perfumes, corrosion inhibitors, coloring agents, and similar additives that perform particular and additional functions, when those additives are supplied in conventional amounts and so long as they do not interfere with the essential rejuvenating characteristic of the agent which is present in the products of this invention. It has been found that products having a desirable permanent blue color may be produced by incorporating in the agent a small amount of a compatible dye such as F, D and C Blue No. 2, Indigotine, for example about 0.1% dye, based on the weight of the solid salt.

The examples which follow are intended to illustrate the method and products of this invention in somewhat greater detail, but it is to be understood that they are illustrative only and that the proportions of agent employed, the conditions of manufacture and the methods of use are illustrative only and do not define the limits of this invention which have been set forth hereinabove and in the appended claims.

EXAMPLE I

A composition was prepared by admixing two mols of $H_3PO_4$, 65%, 0.05 mol of a material which contains about an equal molar mixture of disodium-4-dodecyl-2, 4'oxydibenzene sulfonate and disodium-2, 2' oxy-bis, 4-dodecyl benzene sulfonate, and 0.02 mol of disodium di-naphthyl methane sulfonate with sufficient water to form an agent composition containing approximately 22% by weight of active ingredients.

The agent composition was applied by spraying to various grades of salt including No. 1 rock salt, evaporated granulated salt, Alberger fine flake salt, C rock salt and A rock salt, each type of salt having added to it the agent in an amount of 2 ounces per 15 lbs., while the salt was being constantly tumbled in a mortar mixer. Samples of each of the treated salt materials were placed in cylindrical glass containers and observed for retention of the agent on the surface of the salt particles. It was observed that no drainage occurred from any of the products after a 24 hour period other than the No. 1 rock salt, which has a screen size analysis, using U.S. standard screens, as follows:

3% retained on screen 2½; 15% retained on screen 3; 21.8% retained on screen 3½; 28.2% retained on screen 4; 22.6% retained on screen 5; and 6.8% retained on screen 6.

Each of the other types of salt have finer particle size than No. 1 rock, with the particle sizes becoming increasingly smaller in the order of A rock, C rock, evaporated granulated and Alberger fine flake salt.

EXAMPLE II

Salt briquettes were made from Alberger fine flake type salt by feeding the salt into a briquette press operating at a pressure of about 25,000 p.s.i. to produce pillow-type briquettes having a size of about ¾" long, ½" wide and ⅜" high. 100 lbs. of these briquettes were placed in a mortar mixer and were spray coated with 1.033 lbs. of the agent described above in Example I, the mixing was continued for about 3 minutes and the nuggets were then taken from the mixer, stored in 50 lb. 5 mil thickness polyethylene bags for one month at room temperature. At the end of one month, a representative 202 gram sample of the briquette was taken from a 50 lb. bag and subjected to a controlled dissolution test to determine the rate of release of the agent as the salt dissolved. The test was conducted by placing the entire sample in a 1,000 ml. beaker and covering the sample with distilled water and removing the distilled water after 1 minute to form sample No. 1.

The briquettes were again covered with water for 1 minute and the solution decanted and labelled No. 2. This procedure was repeated for 20 times, at which point the briquettes were 77.3% dissolved and the test was discontinued. All the samples were then analyzed for agent concentration by a titration with sodium hydroxide using phenolphthalein as indicator and the solutions were then evaporated to dryness to establish the amount of salt in each sample. The results of these tests are set forth in Table I, the concentration of agent being expressed in terms of ounces of agent per 15 lbs. of salt.

*Table I*

| Sample | Ounces of Agent Per 15 lbs. of Salt | Percent of Briquettes Dissolved |
| --- | --- | --- |
| 1 | 2.92 | 25.30 |
| 2 | 2.00 | |
| 3 | 2.24 | |
| 4 | 2.10 | |
| 5 | 2.10 | |
| 6 | 2.22 | 46.54 |
| 7 | 2.24 | |
| 8 | 2.12 | |
| 9 | 2.36 | |
| 10 | 2.28 | |
| 11 | 2.14 | 63.36 |
| 12 | 2.24 | |
| 13 | 2.28 | |
| 14 | 2.18 | |
| 15 | 2.24 | |
| 16 | 2.20 | 77.33 |
| 17 | 2.24 | |
| 18 | 2.10 | |
| 19 | 2.08 | |
| 20 | 2.06 | |

EXAMPLE III

Alberger flake type salt was placed in a mortar mixer and with the blade in motion, the agent described above in Example I was added to the salt at the rate of 2 ounces of agent per 15 lbs. of salt. After the agent was uniformly blended with the salt, the salt was placed in a briquetting press and pillow-shaped briquettes were formed using a pressure of about 25,000 p.s.i., the briquettes having a size of about ¾" long, ½" wide and ⅜" high. A representative 200 gram sample of briquettes was extracted from a 100 lb. bag of the briquettes and subjected to a controlled dissolving test following the procedure above specified in Example II. The briquettes released the included agent relatively uniformly as the briquettes were dissolved, the results of the tests being set forth below in Table II.

*Table II*

| Sample | Ounces of Agent Per 15 lbs. of Salt | Percent of Briquettes Dissolved |
| --- | --- | --- |
| 1 | 1.75 | 7.2 |
| 2 | 1.38 | 14.0 |
| 3 | 1.24 | 20.1 |
| 4 | 1.33 | 25.7 |
| 5 | 1.38 | 30.9 |
| 6 | 1.50 | 36.0 |
| 7 | 1.50 | 40.9 |
| 8 | 1.52 | 45.6 |
| 9 | 1.59 | 49.8 |
| 10 | 1.59 | 53.6 |
| 11 | 1.57 | 57.6 |
| 12 | 1.68 | 61.2 |
| 13 | 1.80 | 64.3 |
| 14 | 1.77 | 67.6 |
| 15 | 1.84 | 70.7 |
| 16 | 1.80 | 73.4 |
| 17 | 1.89 | 75.9 |
| 18 | 1.93 | 78.4 |
| 19 | 2.02 | 80.6 |
| 20 | 2.10 | 82.5 |

EXAMPLE IV

A production size batch of salt containing the agent of this invention was prepared by placing the liquid agent described above in detail in Example I in a plastic tank, equipped with globe and needle valves to regulate a ⅜" diameter glass flow meter adapted to control the rate of feeding of the agent to salt being moved by screw conveyor under the exit spout of the tank. Alberger flake type salt being screw conveyed by a 12" diameter screw in a square wood casing was moved past the spout and agent dripped into the salt in an amount of 0.1 gallon per minute of liquid agent, which quantity was admixed with 98.3 lbs. of salt, which corresponds to 2 ounces of agent per 15 lbs. of salt. The salt mixture was then directly fed to briquette rolls which were operating to produce salt briquettes at a pressure of about 25,000 p.s.i. The briquette rolls were observed to be clean and shiny within a few minutes after the briquetting operation was begun and no difficulty was encountered in the continuous manufacture of 9.5 tons of briquettes.

EXAMPLE V

Briquettes made in accordance with the procedure set forth in Example IV were used to compare the effectiveness of the briquettes in rejuvenating iron fouled ion exchange resins in comparison to the use of the same agent in bulk form.

In beakers containing 140 ml. of water, ½ teaspoon of iron fouled amber cation resin beads were added. To one of the beakers 11 salt briquettes made in accordance with the procedures of Example IV were added and dissolved with stirring. To the other beaker 2 ml. of the agent described above in Example I was added after dissolving 11 salt briquettes in the water, which briquettes were free of agent. These mixtures were stirred frequently over a 3-day period, then filtered, the beads washed with water and inspected under a binocular microscope. The beads from the beaker containing the plain salt briquettes and the added liquid agent were of a uniformly light yellow color. The beads from the beaker containing the salt briquettes having the agent incorporated within the briquettes had an indistinguishable uniform light yellow color.

A control sample containing an equivalent portion of similarly iron fouled amber cation resin beads to which was added 11 plain salt briquettes, after the same 3-day period, had the original appearance of dark amber colored beads.

What is claimed is:

1. A water soluble particulated material having on the surface of at least a portion of the particles thereof about 0.02% to about 0.5% by weight of a composition containing as its essential constituents, (1) at least one mineral acid, (2) a diphenyl ether compound having the formula

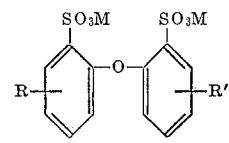

wherein M is an alkali metal, R and R' are selected from the group consisting of hydrogen and alkyl radicals having 1 to 20 carbons and when R is hydrogen, R' is an alkyl radical and vice versa, and (3) a di-alkali metal sulfonate of di-naphthyl methane, said constituents being present in quantities of about 100 to about 300 mols of (1), about 3 to about 7 mols of (2) and about 1.5 to about 3 mols of (3).

2. Salt having on the surface of at least a portion of the particles thereof about 0.02% to about 0.5% by weight of the composition containing as its essential constituents, (1) at least one mineral acid, (2) a diphenyl ether compound having the formula

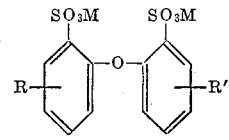

wherein M is an alkali metal, R and R' are selected from the group consisting of hydrogen and alkyl radicals having 1 to 20 carbons and when R is hydrogen, R' is an alkyl radical and vice versa, and (3) a di-alkali metal sulfonate of di-naphthyl methane corresponding to the alkali hydroxide neutralization product of sulfonated naphthalene and formaldehyde, said constituents being present in quantities of about 100 to about 300 mols of (1), about 3 to about 7 mols of (2) and about 1.5 to about 3 mols of (3).

3. Salt in solid form larger than aggregates which will pass through a 14 mesh screen containing distributed therethrough about 0.02% to about 0.5% by weight of the composition containing as its essential constituents, (1) at least one mineral acid, (2) a diphenyl ether compound having the formula

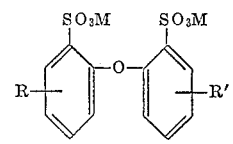

wherein M is an alkali metal, R and R' are selected from the group consisting of hydrogen and alkyl radicals having 1 to 20 carbons and when R is hydrogen, R' is an alkyl radical and vice versa, and (3) a di-alkali metal sulfonate of di-naphthyl methane corresponding to the alkali hydroxide neutralization product of sulfonated naphthalene and formaldehyde, said constituents being present in quantities of about 100 to about 300 mols of (1), about 3 to about 7 mols of (2) and about 1.5 to about 3 mols of (3).

4. Salt as claimed in claim 3 wherein said salt is in the form of blocks.

5. Salt as claimed in claim 3 wherein said salt is in the form of briquettes.

6. Salt as claimed in claim 3 wherein said salt is in the form of extruded shapes.

7. The method of making a composite product which comprises the steps of mixing with a water soluble particulate material a composition containing as its essential constituents, (1) at least one mineral acid, (2) a diphenyl ether compound having the formula

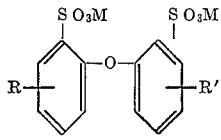

wherein M is an alkali metal, R and R' are selected from the group consisting of hydrogen and alkyl radicals having 1 to 20 carbons and when R is hydrogen, R' is an alkyl radical and vice versa, and (3) a di-alkali metal sulfonate of di-naphthyl methane, said constituents being present in quantities of about 100 to about 300 mols of (1), about 3 to about 7 mols of (2) and about 1.5 to about 3 mols of (3), said composition being present in an amount in the range of about 0.02% to about 0.5% by weight.

8. The method of making a composite product which comprises the steps of mixing with a water soluble particulate material a composition containing as its essential constituents, (1) at least one mineral acid, (2) a diphenyl ether compound having the formula

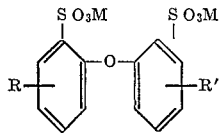

wherein M is an alkali metal, R and R' are selected from the group consisting of hydrogen and alkyl radicals having 1 to 20 carbons and when R is hydrogen, R' is an alkyl radical and vice versa, and (3) a di-alkali metal sulfonate of di-naphthyl methane corresponding to the alkali hydroxide neutralization product of sulfonated naphthalene and formaldehyde, said constituents being present in quantities of about 100 to about 300 mols of (1), about 3 to about 7 mols of (2) and about 1.5 to about 3 mols of (3), and compressing said mixed particulate material into a solid aggregate larger than 14 screen mesh, said composition being present in an amount in the range of about 0.02% to about 0.5% by weight.

9. A method of simultaneously rejuvenating ion exchange resins fouled with iron and regenerating the same, which comprises the steps of forming a brine from a water soluble particulated material having on the surface of at least a portion of the particles thereof about 0.02% to about 0.5% by weight of a composition containing as its essential constituents, (1) at least one mineral acid, (2) a diphenyl ether compound having the formula

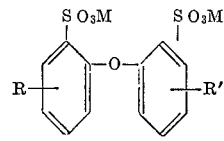

wherein M is an alkali metal, R and R' are selected from the group consisting of hydrogen and alkyl radicals having 1 to 20 carbons and when R is hydrogen, R' is an alkyl radical and vice versa, and (3) a di-alkali metal sulfonate of di-naphthyl methane, said constituents being present in quantities of about 100 to about 300 mols of (1), about 3 to about 7 mols of (2) and about 1.5 to about 3 mols of (3), and passing said brine over said fouled resin.

References Cited by the Examiner
UNITED STATES PATENTS

| 2,854,477 | 9/58 | Steinhaurer et al. | 252—353 |
| 2,977,313 | 3/61 | Roland | 21—2.7 |
| 2,990,375 | 6/61 | Steinhaurer et al. | 260—512 |
| 3,078,224 | 2/63 | Schulze et al. | 210—30 |
| 3,083,166 | 3/63 | Harding | 252—136 |
| 3,110,683 | 11/63 | Steinhaurer | 252—161 |

OTHER REFERENCES

"Text" Surface Active Agents, Schwartz-Perry, copyright 1949 by Interscience Publishers Inc., pages 129–130 relied upon.

MORRIS O. WOLK, *Primary Examiner.*